(12) United States Patent
Li et al.

(10) Patent No.: US 9,652,064 B2
(45) Date of Patent: May 16, 2017

(54) TOUCH DISPLAY MODULE AND DRIVING METHOD THEREOF AND SOURCE DRIVER

(71) Applicant: HIMAX TECHNOLOGIES LIMITED, Tainan (TW)

(72) Inventors: Zhu-Rong Li, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 14/221,030

(22) Filed: Mar. 20, 2014

(65) Prior Publication Data

US 2015/0268745 A1 Sep. 24, 2015

(51) Int. Cl.
*G06F 3/041* (2006.01)
*G06F 3/044* (2006.01)

(52) U.S. Cl.
CPC .......... *G06F 3/0412* (2013.01); *G06F 3/044* (2013.01)

(58) Field of Classification Search
CPC .................................................... G06F 3/0412
See application file for complete search history.

(56) References Cited

U.S. PATENT DOCUMENTS

| 7,504,979 | B1 * | 3/2009 | Knausz | H03M 1/0648 |
| | | | | 341/141 |
| 2006/0214895 | A1 * | 9/2006 | Shih | G09G 3/3607 |
| | | | | 345/88 |
| 2008/0309627 | A1 * | 12/2008 | Hotelling | G02F 1/134363 |
| | | | | 345/173 |
| 2010/0097346 | A1 * | 4/2010 | Sleeman | G06F 3/0412 |
| | | | | 345/174 |
| 2010/0214248 | A1 | 8/2010 | Takano et al. | |
| 2011/0115717 | A1 * | 5/2011 | Hable | G06F 3/0416 |
| | | | | 345/173 |
| 2011/0193820 | A1 * | 8/2011 | Chen | G06F 3/0412 |
| | | | | 345/174 |
| 2011/0254795 | A1 * | 10/2011 | Chen | G06F 3/0412 |
| | | | | 345/173 |

(Continued)

FOREIGN PATENT DOCUMENTS

TW 201349061 12/2013

OTHER PUBLICATIONS

The Care, Feeding, and Application of the Unity Gain Buffer, Mar. 23, 1998, intersil.*

(Continued)

*Primary Examiner* — Benjamin C Lee
*Assistant Examiner* — Dong Hui Liang
(74) *Attorney, Agent, or Firm* — J.C. Patents

(57) ABSTRACT

A touch display module, a driving method thereof and a source driver are provided. The touch display module includes a touch display panel and at least one source driver. The source driver is coupled to a plurality of data lines of the touch display panel. In a display mode, the source driver respectively outputs a plurality of pixel driving signals to the data lines for driving the touch display panel to display a corresponding image. In a touch mode, the source driver clusters the data lines into multiple groups, and respectively outputs a plurality of touch driving signals to the groups. The data lines belonging to a same group are provided with a same touch driving signal in the touch mode.

17 Claims, 3 Drawing Sheets

(56) References Cited

U.S. PATENT DOCUMENTS

| | | | |
|---|---|---|---|
| 2012/0032995 A1* | 2/2012 | Lee .................... | G09G 3/2011 |
| | | | 345/690 |
| 2014/0184543 A1* | 7/2014 | Kim .................... | G06F 3/0412 |
| | | | 345/173 |
| 2015/0022486 A1* | 1/2015 | Li ......................... | G06F 3/044 |
| | | | 345/174 |

OTHER PUBLICATIONS

"The Care, Feeding, and Application of the Unity Gain Buffer", Mar. 23, 1998, intersil.*
"TS5A9411 Datasheet", Jul. 2008, Texas Instruments.*
"Analog Switch Guide", 2012, Texas Instruments.*
"Office Action of Taiwan Counterpart Application", issued on Jun. 12, 2015, p. 1-p. 5, in which the listed references were cited.

* cited by examiner

TOUCH DISPLAY MODULE AND DRIVING METHOD THEREOF AND SOURCE DRIVER

BACKGROUND OF THE INVENTION

Field of the Invention

The invention relates to an electronic device, and more particularly to a touch display module, a driving method thereof and a source driver.

Description of Related Art

A gate driver and a source driver respectively drive scan lines (gate lines) and data lines (source lines) of a liquid crystal display panel. The gate driver sequentially provides voltages to enable pixels of the scan lines, and the source driver provides pixel driving signals related to image data to the data lines. Accordingly, the source driver is capable of driving the liquid crystal display panel to display a corresponding image.

An in-cell touch display panel is a display panel embedded with touch sensors. In comparison with a traditional touch display panel in which a touch panel and a display panel are combined to each other through adhesives, the in-cell touch display panel is advantageous in having smaller thickness, high transmittance and so forth. A touch driving circuit configured to detect touch events of the in-cell touch display panel includes a transmitter (Tx) and a receiver (Rx). The transmitter transmits touch driving signals to driving lines of the in-cell touch display panel, and the receiver senses sensing lines of the in-cell touch display panel. The touch driving circuit of conventional art is independent from the source driver.

SUMMARY OF THE INVENTION

The invention is directed to a touch display module and a driving method thereof and a source driver, capable of utilizing the source driver as a transmitter for touch detection.

The embodiment of the invention discloses a touch display module, which includes a touch display panel and at least one source driver. The touch display panel has a plurality of data lines. The source driver is coupled to the data lines of the touch display panel. In a display mode, the source driver respectively outputs a plurality of pixel driving signals to the data lines for driving the touch display panel to display a corresponding image. In a touch mode, the source driver clusters the data lines into multiple groups, and respectively outputs a plurality of touch driving signals to the groups. The data lines belonging to a same group are provided with a same touch driving signal in the touch mode.

The embodiment of the invention discloses a source driver, which includes a reference voltage bus, a plurality of driving channels and a voltage generation circuit. Each of the driving channels includes a latch and a first multiplexer. The latch latches and outputs a pixel data in the display mode. The latch latches and outputs a cluster data in the touch mode. A control terminal of the first multiplexer is coupled to an output terminal of the latch for receiving the pixel data or the cluster data. A plurality of input terminals of the first multiplexer are coupled one by one to different conductive lines of the reference voltage bus. An output terminal of the first multiplexer outputs one of the pixel driving signals or one of the touch driving signals. A plurality of output terminals of the voltage generation circuit are coupled one by one to the conductive lines of the reference voltage bus. Therein, the voltage generation circuit provides a plurality of gamma voltages through the reference voltage bus to the input terminals of the first multiplexers in the display mode, and provides a plurality of touch panel signals through the reference voltage bus to the input terminals of the first multiplexers in the touch mode.

The embodiment of the invention discloses a driving method of a touch display module. The driving method includes: respectively providing a plurality of pixel driving signals to a plurality of data lines of a touch display panel in a display mode for driving the touch display panel to display a corresponding image; clustering the data lines into a plurality of groups in a touch mode, and respectively outputting a plurality of touch driving signals to the groups in the touch mode. Therein, the data lines belonging to a same group are provided with a same touch driving signal in the touch mode.

To make the above features and advantages of the disclosure more comprehensible, several embodiments accompanied with drawings are described in detail as follows.

DESCRIPTION OF THE EMBODIMENTS

Figure 1:
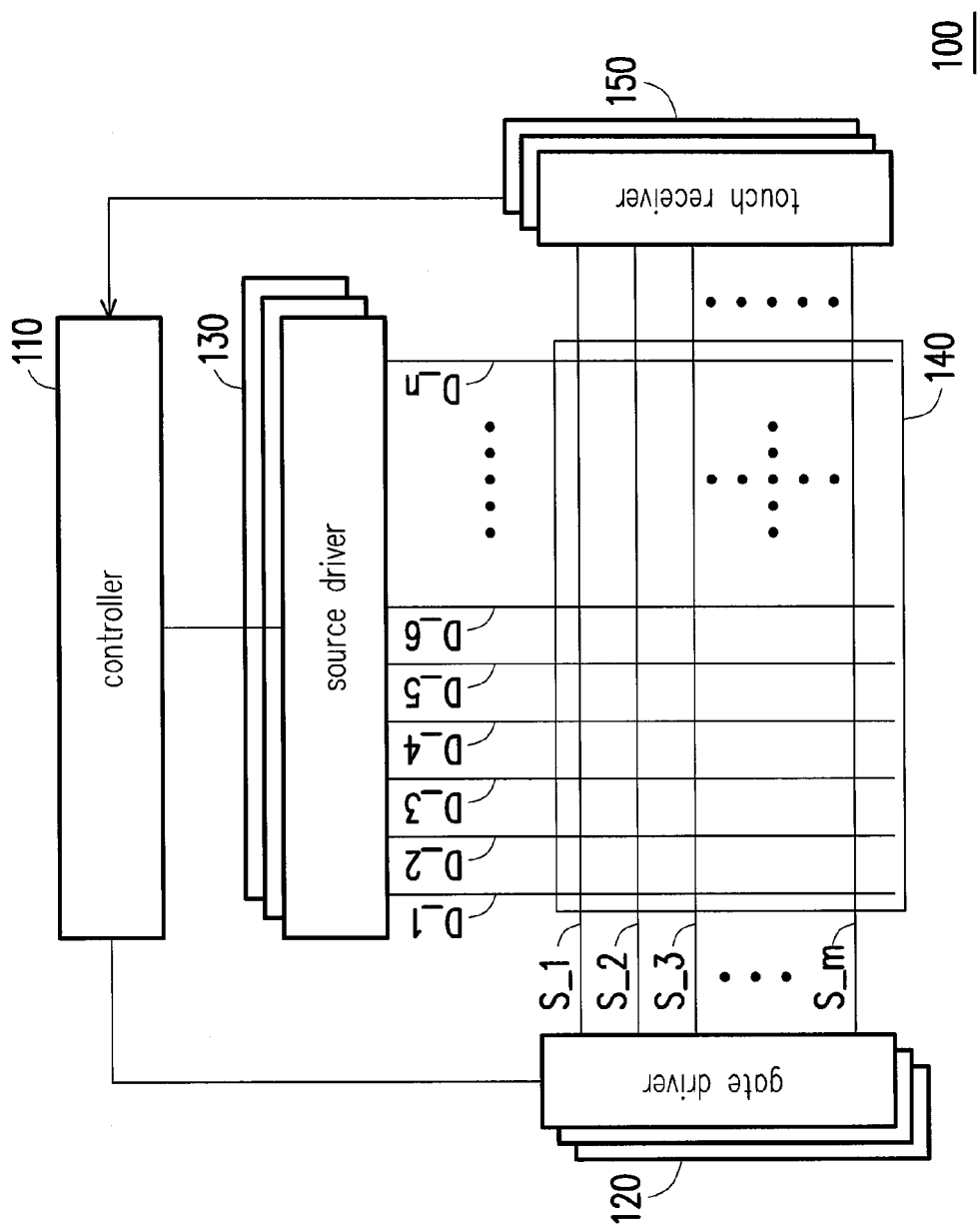
FIG. 1 is a block diagram illustrating circuitry of a touch display module according to an embodiment of the invention.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a block diagram illustrating circuitry of a touch display module 100 according to an embodiment of the invention. The touch display module 100 includes a controller 110, at least one gate driver 120, at least one source driver 130, a touch display panel 140 and at least one touch receiver 150. The touch display panel 140 has a plurality of data lines (e.g., the data lines D_1, D_2, D_3, D_4, D_5, D_6, ..., D_n) and a plurality of scan lines (e.g., the scan lines S_1, S_2, S_3, ..., S_m). The gate driver 120 is coupled to the scan lines S_1 to S_m of the touch display panel 140, and the source driver 130 is coupled to the data lines D_1 to D_n of the touch display panel 140. A driving method of the touch display module 100 is described below.

Based on controls from the controller 100, the gate driver 120 and the source driver 130 respectively drive the scan lines (gate lines) S_1 to S_m and the data lines (source lines) D_1 to D_n of the touch display panel 140 in a display mode. The gate driver 120 sequentially provides voltages to enable pixels of the scan lines S_1 to S_m, and the source driver 130 respectively provides a plurality of pixel driving signals related to an image data to the data lines D_1 to D_n.

Accordingly, the source driver 130 is capable of driving the touch display panel 140 to display a corresponding image in the display mode. In the display mode, the touch receiver 150 may be disabled.

In a touch mode, the gate driver 120 may be disabled, and the touch receiver 150 may be enabled. The source driver 130 clusters the data lines D_1 to D_n into a plurality of groups in the touch mode. The source driver 130 respectively outputs a plurality of touch driving signals to said groups in the touch mode. The data lines belonging to a same group are provided with a same touch driving signal in the touch mode. In other words, the source driver 130 may be use as a transmitter (Tx) for touch detection in the touch mode, and the data lines D_1 to D_n may be used as driving lines of a touch panel in the touch mode. The touch driving signals include a sine signal, a cosine signal, a clock pulse, or other driving signals for touch detection. Based on the touch driving signals of the data lines D_1 to D_n, the touch receiver 150 may sense/read information from the scan lines S_1 to S_m in the touch mode, and transmit said information to the controller 110. By analyzing/calculating the information provided by the touch receiver 150, the controller 100 may determine whether touch events are occurred on the touch display panel 140, and obtain a touch position on the touch display panel 140.

For instance, in some embodiments, the data lines D_1 to D_3 may be clustered into a first group for collaboratively transmitting first touch driving signals provided by the source driver 130, and the data lines D_4 to D_6 may be clustered into a second group for collaboratively transmitting second touch driving signals provided by the source driver 130, and the rest may be deduced by analogy. In some other embodiments, the data lines D_1 to D_6 may be clustered into a first group for collaboratively transmitting first touch driving signals provided by the source driver 130, and the data lines D_7 to D_12 (not illustrated) may be clustered into a second group for collaboratively transmitting second touch driving signals provided by the source driver 130. During process for driving said groups, the touch receiver 150 may sense/read information of the groups in the touch mode, and transmit said information to the controller 110.

A method of clustering the data lines D_1 to D_n is not limited only to aforesaid method. In some other embodiments, quantities of the data lines in different groups are different from one another. For instance, the quantity of the data lines in the group at edges of the touch display panel 140 may be greater than the quantity of the data lines in the group at center of the touch display panel 140. In other embodiments, the touch display panel 140 may be defined with a stylus-touch region (for detecting touch events of a stylus) and a finger-touch region (for detecting touch events of a finger). Because sizes of area being touched by the two are different, the stylus-touch region requires higher touch resolution, and the finger-touch region requires lower touch resolution. Accordingly, the quantity of the data lines in the group in the finger-touch region of the touch display panel 140 may be greater than the quantity of the data lines in the group in the stylus-touch region of the touch display panel 140.

In view of above, the source driver 130 may be used as the transmitter touch detection in the touch mode; the data lines D_1 to D_n may be used as driving electrodes of a touch sensor in the touch mode; and the scan lines S_1 to S_m may be used as sensing electrodes of the touch sensor in the touch mode. Because the data lines D_1 to D_n may be clustered in into multiple groups, the touch resolution of the touch display panel 140 may be decided according to actual requirements in the touch mode. In other words, a display resolution may be different form the touch resolution. Further, in comparison to energy transmitted by one single data line, the grouped data lines (the data lines belonging to the same group) may collaboratively transmit larger energy for touch detection.

Figure 2:
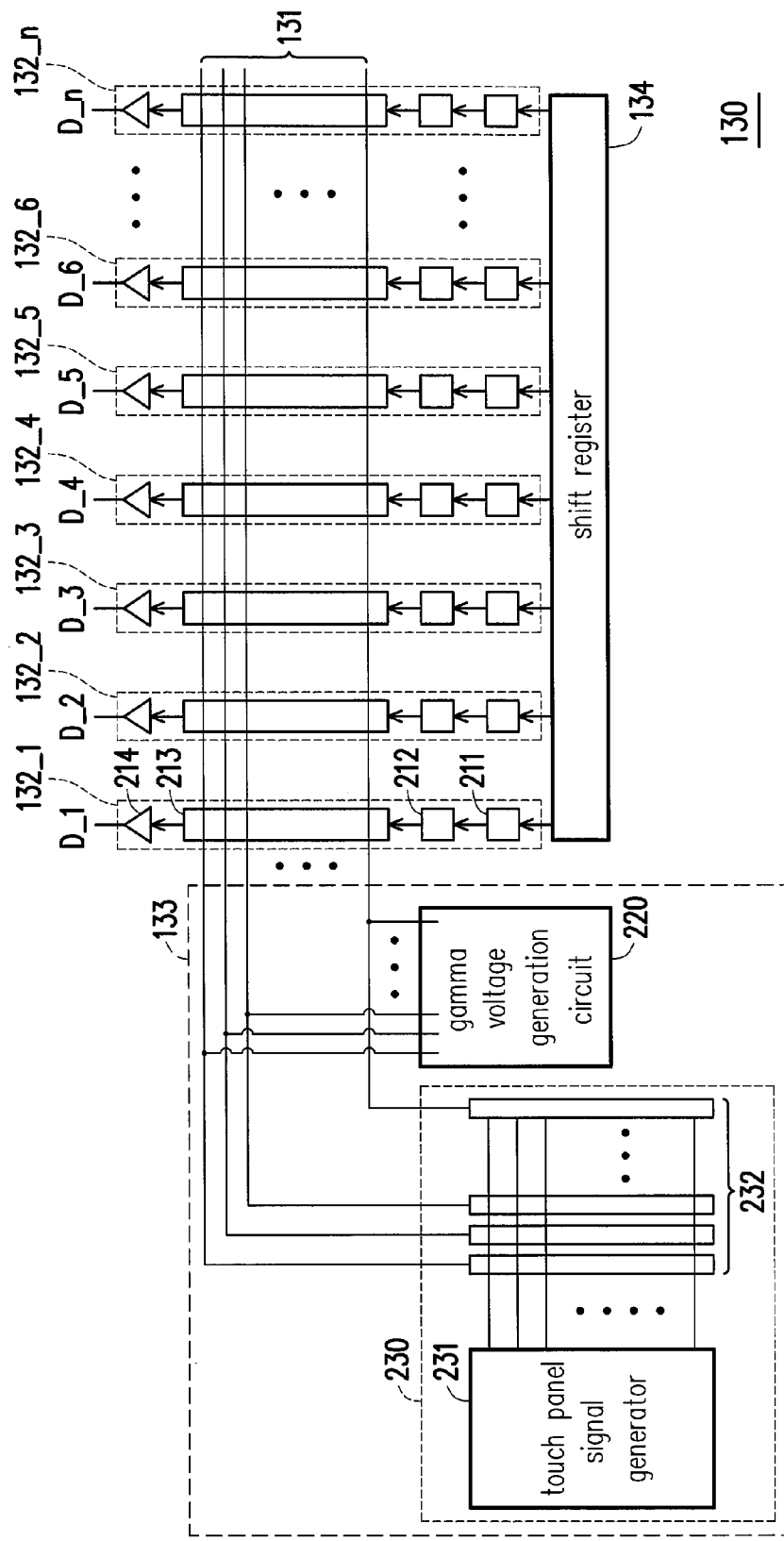
FIG. 2 is a block diagram illustrating circuitry of the source driver depicted in FIG. 1 according to an embodiment of the invention.

FIG. 2 is a block diagram illustrating circuitry of the source driver 130 depicted in FIG. 1 according to an embodiment of the invention. The source driver 130 depicted in FIG. 2 includes a reference voltage bus 131, a plurality of driving channels (the driving channels 132_1, 132_2, 132_3, 132_4, 132_5, 132_6, . . . , 132_n), a voltage generation circuit 133 and a shift register 134. Each of the driving channels 132_1 to 132_n includes a latch and a first multiplexer. The driving channel 132_1 is used as an example for description below, and the rest of the driving channels 132_2 to 132_n may be deduced by analogy.

The driving channel 132_1 includes a first latch 211, a second latch 212, a first multiplexer 213 and a buffer 214. In some exemplary embodiments, the buffer 214 may be implemented with a unity-gain buffer. An input terminal of the first latch 211 receives a pixel data provided by the controller 110. A trigger terminal of the first latch 211 receives a latch clock provided by the shift register 134. An input terminal of the second latch 212 is coupled to an output terminal of the first latch 211. A trigger terminal of the second latch 212 receives a line latch signal provided by the controller 110. The second latch 212 may decide whether to latch and output the pixel data provided by the first latch 211 according to the line latch signal provided by the controller 110 in the display mode. The second latch 212 latches and outputs a cluster data in the touch mode.

A control terminal of the first multiplexer 213 is coupled to an output terminal of the second latch 212 for receiving the pixel data or the cluster data. A plurality of input terminals of the first multiplexer 213 are coupled one by one to different conductive lines of the reference voltage bus 131. The first multiplexer 213 may select one of the conductive lines of the reference voltage bus 131 according to the pixel data provided by the second latch 212 in the display mode, and transmit a gamma voltage (or a gray scale voltage) of the selected conductive line to the output terminal of the first multiplexer 213. Accordingly, the output terminal of the first multiplexer 213 may output the pixel driving signals corresponding to the pixel data in the display mode. The first multiplexer 213 may be referred to as a digital-to-analog converter (DAC). So, the first multiplexer 213 may couple one of the conductive lines of the reference voltage bus 131 to the output terminal of the first multiplexer 213 according to the cluster data provided by the second latch 212 in the touch mode. Accordingly, the output terminal of the first multiplexer 213 may output one of the touch driving signals corresponding to the group to which it belongs in the touch mode.

An input terminal of the buffer 214 is coupled to the output terminal of the first multiplexer 213. An output terminal of the buffer 214 is coupled to one corresponding data line D_1 among the data lines D_1 to D_n of the touch display panel 140. In other embodiments, the buffer 214 may be omitted according to design requirements. In case the buffer 214 is omitted, the output terminal of the first multiplexer 213 may be coupled to the corresponding data line D_1 of the touch display panel 140.

A plurality of output terminals of the voltage generation circuit 133 are coupled one by one to the different conductive lines of the reference voltage bus 131. The voltage generation circuit 133 provides a plurality of gamma voltages (fixed voltages) in different levels through the reference voltage bus 131 to the output terminals of the first multiplexers 213 of the driving channels 132_1 to 132_n in the display mode. The voltage generation circuit 133 provides a plurality of touch panel signals through the reference voltage bus 131 to the output terminals of the first multiplexers 213 of the driving channels 132_1 to 132_n in the touch mode. In the present embodiment, the touch panel signals include a sine signal or a cosine signal. In other embodiments, the touch panel signals include a plurality of clock pulses in different phases, or other driving signals for touch detection.

In the embodiment depicted in FIG. 2, the voltage generation circuit 133 includes a gamma voltage generation circuit 220 and a touch panel signal generation circuit 230. A plurality of output terminals of the gamma voltage generation circuit 220 are coupled one by one to the different conductive lines of the reference voltage bus 131. The gamma voltage generation circuit 220 provides a plurality of gamma voltages (fixed voltages in different levels) through the reference voltage bus 131 to the output terminals of the first multiplexers 213 of the driving channels 132_1 to 132_n in the display mode. The gamma voltage generation circuit 220 is disabled in the touch mode.

A plurality of output terminals of the touch panel signal generation circuit 230 are coupled one by one to the different conductive lines of the reference voltage bus 131. The touch panel signal generation circuit 230 provides a plurality of touch panel signals (e.g., the sine signal, the cosine signal, the clock pulse, or the other driving signals for touch detection) through the reference voltage bus 131 to the output terminals of the first multiplexers 213 of the driving channels 132_1 to 132_n in the touch mode. The touch panel signal generation circuit 230 is disabled in the display mode.

In the embodiment depicted in FIG. 2, the touch panel signal generation circuit 230 includes a touch panel signal generator 231 and a plurality of second multiplexers 232. The touch panel signal generator 321 generates the touch panel signals. A plurality of input terminals of any one of the second multiplexers 232 are coupled one by one to different output terminals of the touch panel signal generator 231 for receiving the different touch panel signals. An output terminal of any one of the second multiplexers 232 is coupled to one of the conductive lines of the reference voltage bus 131. The second multiplexers 232 are controlled by the controller 110.

When the source driver 130 operates in the display mode, the gamma voltage generation circuit 220 provides a plurality of gamma voltages (fixed voltages in different levels) through the reference voltage bus 131 to the output terminals of the first multiplexers 213 of the driving channels 132_1 to 132_n. Accordingly, the driving channels 132_1 to 132_n may convert the image data into the related pixel driving signals for driving the touch display panel 140 to display the corresponding image.

When the source driver 130 operates in the touch mode, the touch panel signal generator 230 provides a plurality of touch panel signals (e.g., the sine signal, the cosine signal, the clock pulse, or the other driving signals for touch detection) through the reference voltage bus 131 to the output terminals of the first multiplexers 213 of the driving channels 132_1 to 132_n. The second latches 212 of the driving channels 132_1 to 132_n latch and output the corresponding cluster data in the touch mode. According to the cluster data, the driving channels 132_1 to 132_n and the data lines D_1 to D_n may be clustered into multiple groups. For instance (but the invention is not limited there to), in some embodiments, the second latches 212 of the driving channels 132_1 to 132_2 may output the cluster data "00"; the second latches 212 of the driving channels 132_3 to 132_4 may output the cluster data "01"; and the second latches 212 of the driving channels 132_5 to 132_6 may output the cluster data "02". According to the cluster data, the data lines D_1 to D_2 may be clustered into the a first group to collaboratively transmit the touch panel signals provided by a first conductive line of the reference voltage bus 131 to be used as the touch driving signals; the data lines D_3 to D_4 may be clustered into the a second group to collaboratively transmit the touch panel signals provided by a second conductive line of the reference voltage bus 131 to be used as the touch driving signals; and the data lines D_5 to D_6 may be clustered into the a third group to collaboratively transmit the touch panel signals provided by a third conductive line of the reference voltage bus 131 to be used as the touch driving signals.

In some other embodiments, the second latches 212 of the driving channels 132_1 to 132_3 may output a cluster data "00", and the second latches 212 of the driving channels 132_4 to 132_6 may output a cluster data "02". According to the cluster data, the data lines D_1 to D_3 may be clustered into a first group to collaboratively transmit the touch panel signals provided by a first conductive line of the reference voltage bus 131 to be used as the touch driving signals, and the data lines D_4 to D_6 may be clustered into a second group to collaboratively transmit the touch panel signals provided by a third conductive line of the reference voltage bus 131 to be used as the touch driving signals.

As another example, assuming that the source driver 130 includes 1000 data lines (or driving channel). In the present embodiment, the data outputted by the second latches 212 of the driving channels corresponding to the $1^{st}$ to $100^{th}$ data lines is 00; the data outputted by the second latches 212 of the driving channels corresponding to the $101^{st}$ to $200^{th}$ data lines is 01; the data outputted by the second latches 212 of the driving channels corresponding to the $201^{st}$ to $300^{th}$ data lines is 02; and the rest may be deduced by analogy. As a result, said 1000 data lines (or the driving channels) are clustered into 10 groups (1000/100=10).

After the data lines (or the driving channels) are clustered, the controller 110 may control the second multiplexers 232 to change the touch driving signals of the groups. For instance, during a first period of the touch mode, the second multiplexer 232 may transmit a sine signal (+sin) provided by the touch panel signal generator 231 to a first conductive line of the reference voltage bus 131, transmit a negative sine signal (−sin) provided by the touch panel signal generator 231 to a second conductive line of the reference voltage bus 131, transmit a cosine signal (+cos) provided by the touch panel signal generator 231 to a third conductive line of the reference voltage bus 131, and transmit a negative cosine signal (−cos) provided by the touch panel signal generator 231 to a fourth conductive line of the reference voltage bus 131. During a second period of the touch mode, the second multiplexer 232 may transmit the cosine signal (+cos) provided by the touch panel signal generator 231 to the first conductive line of the reference voltage bus 131, transmit the negative cosine signal (−cos) provided by the touch panel signal generator 231 to the second conductive line of the reference voltage bus 131, transmit the sine signal (+sin) provided by the touch panel signal generator 231 to the third conductive line of the reference voltage bus 131, and transmit the negative sine signal (−sin) provided by the touch panel signal generator 231 to the fourth conductive line of the reference voltage bus 131.

In summary, the present embodiment may cluster the driving channels 132_1 to 132_n and the data lines D_1 to D_n into multiple groups by writing the cluster data into the second latches 212 of the driving channels 132_1 to 132_n. Next, the present embodiment may change the touch driving signal of the groups by controlling the second multiplexers 232. Therefore, the source driver 130 may be used as the transmitter for touch detection in the touch mode; the data lines D_1 to D_n may be used as driving electrodes of a touch sensor in the touch mode; and the scan lines S_1 to S_m may be used as sensing electrodes of the touch sensor in the touch mode. The touch resolution of the touch display panel 140 may be flexibly decided by the cluster data in the touch mode. The grouped data lines (the data lines belonging to the same group) may collaboratively transmit larger energy for touch detection.

In other exemplary embodiments, the buffer 214 may be a buffer with signal-conversion function. The voltage generation circuit 133 may generate a digital signals (the touch panel signals) to the first multiplexer 213 of the driving channels 132_1, 132_2, 132_3, 132_4, 132_5, 132_6, . . . , 132_n through the reference voltage bus 131 in the touch mode, respectively. The first multiplexer 213 may select one of the digital signals of the reference voltage bus 131 to output to the buffer 214 according to the cluster data provided by the second latch 212 in the touch mode. The buffer 214 receives the digital signal through the first multiplexer 213, and converts the digital signal into the touch driving signal in the touch mode.

Figure 3:
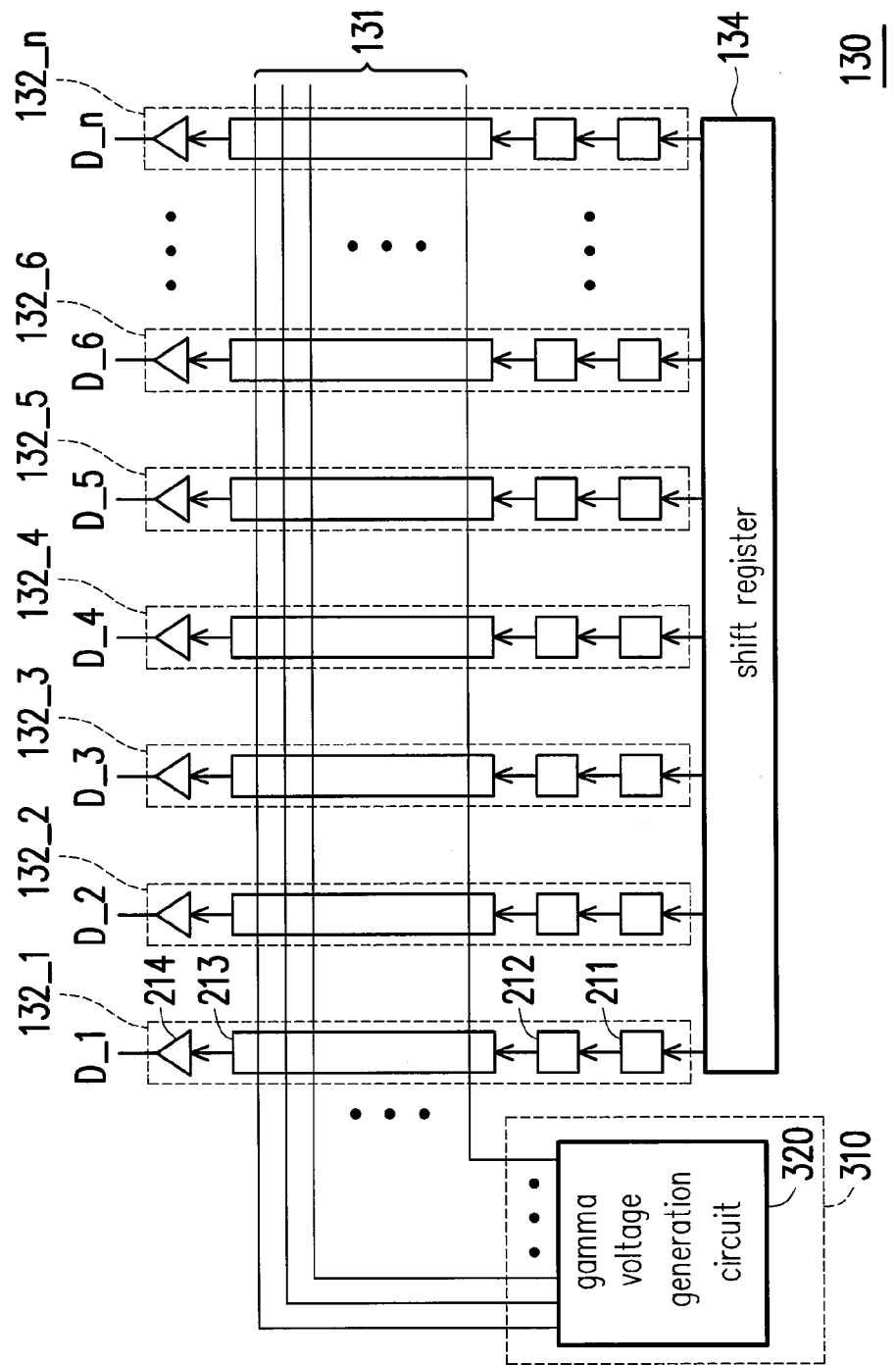
FIG. 3 is a block diagram illustrating circuitry of the source driver depicted in FIG. 1 according to another embodiment of the invention.

FIG. 3 is a block diagram illustrating circuitry of the source driver 130 depicted in FIG. 1 according to another embodiment of the invention. The source driver 130 depicted in FIG. 3 includes a reference voltage bus 131, a plurality of driving channels (the driving channels 132_1, 132_2, 132_3, 132_4, 132_5, 132_6, . . . , 132_n), a voltage generation circuit 310 and a shift register 134. The reference voltage bus 131, the driving channels 132_1 to 132_n and the shift register 134 may be inferred from related description in the embodiment depicted in FIG. 2.

In the embodiment depicted in FIG. 3, the voltage generation circuit 310 includes a gamma voltage generation circuit 320. A plurality of output terminals of the gamma voltage generation circuit 320 are coupled one by one to the different conductive lines of the reference voltage bus 131. The gamma voltage generation circuit 320 provides a plurality of gamma voltages (fixed voltages in different levels) through the reference voltage bus 131 to the output terminals of the first multiplexers 213 of the driving channels 132_1 to 132n in the display mode. The gamma voltage generation circuit 320 provides a plurality of touch panel signals (e.g., the sine signal, the cosine signal, the clock pulse, or the other driving signals for touch detection) through the reference voltage bus 131 to the output terminals of the first multiplexers 213 of the driving channels 132_1 to 132_n in the touch mode.

The embodiment depicted in FIG. 3 may cluster the driving channels 132_1 to 132_n and the data lines D_1 to D_n into multiple groups by writing the cluster data into the second latches 212 of the driving channels 132_1 to 132_n. The data lines belonging to the same group outputs the same touch driving signal in the touch mode. Next, the present embodiment may change the touch driving signal of the groups by using the gamma voltage generation circuit 320. Therefore, the source driver 130 may be used as the transmitter for touch detection in the touch mode; the data lines D_1 to D_n may be used as driving electrodes of a touch sensor in the touch mode; and the scan lines S_1 to S_m may be used as sensing electrodes of the touch sensor in the touch mode. The touch resolution of the touch display panel 140 may be flexibly decided by the cluster data in the touch mode. The grouped data lines (the data lines belonging to the same group) may collaboratively transmit larger energy for touch detection.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A source driver, comprising:
a reference voltage bus;
a plurality of driving channels, wherein each of the driving channels comprises a latch and a first multiplexer, a control terminal of the first multiplexer being coupled to an output terminal of the latch, a plurality of input terminals of the first multiplexer are coupled one by one to different conductive lines of the reference voltage bus; and
a voltage generation circuit having a plurality of output terminals coupled one by one to the conductive lines of the reference voltage bus;
wherein in a display mode, the voltage generation circuit provides a plurality of gamma voltages through the reference voltage bus to the input terminals of the first multiplexer, the latch latches and outputs a digital pixel data to a control terminal of the first multiplexer, and an output terminal of the first multiplexer outputs one of a plurality of pixel driving signals to one of a plurality of data lines of a touch display panel to display a corresponding image; and
wherein in a touch mode, the voltage generation circuit provides a plurality of touch panel signals through the reference voltage bus to the input terminals of the first multiplexer, the control terminal of the first multiplexer receives a digital cluster data from the output terminal of the latch for clustering the data lines into a plurality of groups, and the output terminal of the first multiplexer outputs one of a plurality of touch driving signals to one of the groups, wherein a controller provides the digital pixel data to an input terminal of the latch in the display mode and provides the digital cluster data to the input terminal of the latch in the touch mode.

2. The source driver of claim 1, wherein the driving channels are clustered into a plurality of groups according to the digital cluster data, and the driving channels belonging to a same group are provided with a same touch driving signal in the touch mode.

3. The source driver of claim 1, wherein each of the driving channels further comprises a unity-gain buffer, an input terminal of the unity-gain buffer being coupled to the output terminal of the first multiplexer, and an output terminal of the unity-gain buffer being coupled to one of data lines of a touch display panel.

4. The source driver of claim 1, wherein the touch panel signals comprises a sine signal or a cosine signal.

5. The source driver of claim 1, wherein each of the driving channels further comprises a buffer, an input terminal of the buffer being coupled to the output terminal of the first multiplexer, and an output terminal of the buffer being coupled to one of the data lines of the touch display panel.

6. The source driver of claim 5, wherein the touch panel signals comprises a digital signal, and the buffer receives the digital signal through the first multiplexer and converts the digital signal into the touch driving signal in the touch mode.

7. The source driver of in claim 1, wherein the voltage generation circuit is a gamma voltage generation circuit.

8. The source driver of claim 1, wherein the voltage generation circuit comprises:
a gamma voltage generation circuit having a plurality of output terminals coupled one by one to the conductive lines of the reference voltage bus, wherein the gamma voltage generation circuit provides the gamma voltages through the reference voltage bus to the input terminals of the first multiplexers in the display mode, and the gamma voltage generation circuit is disabled in the touch mode; and
a touch panel signal generation circuit having a plurality of output terminals coupled one by one to the conductive lines of the reference voltage bus, wherein the touch panel signal generation circuit provides the touch panel signals through the reference voltage bus to the input terminals of the first multiplexers in the touch mode, and the touch panel signal generation circuit is disabled in the display mode.

9. The source driver of claim 8, wherein the touch panel signal generation circuit comprises:
a touch panel signal generator generating the touch panel signals; and
a plurality of second multiplexers, a plurality of input terminals of any one of the second multiplexers being coupled to the touch panel signal generator for receiving the touch panel signals, and an output terminal of any one of the second multiplexers being coupled to one of the conductive lines of the reference voltage bus.

10. A touch display module, comprising:
a touch display panel having a plurality of data lines; and
at least one source driver coupled to the data lines of the touch display panel, wherein the source driver comprises a reference voltage bus, a plurality of driving channels and a voltage generation circuit, each of the driving channels comprises a latch and a first multiplexer, a control terminal of the first multiplexer being coupled to an output terminal of the latch, a plurality of input terminals of the first multiplexer are coupled one by one to different conductive lines of the reference voltage bus, a plurality of output terminals of the voltage generation circuit are coupled one by one to the conductive lines of the reference voltage bus;
wherein in a display mode, the voltage generation circuit provides a plurality of gamma voltages through the reference voltage bus to the input terminals of the first multiplexer, the latch latches and outputs a digital pixel data to the control terminal of the first multiplexer, and an output terminal of the first multiplexer outputs one of a plurality of pixel driving signals to one of the data lines for driving the touch display panel to display a corresponding image; and
wherein in a touch mode, the voltage generation circuit provides a plurality of touch panel signals through the reference voltage bus to the input terminals of the first multiplexer, the control terminal of the first multiplexer receives a digital cluster data from the output terminal of the latch for clustering the data lines into a plurality of groups, and the output terminal of the first multiplexer outputs one of a plurality of touch driving signals to one of the groups, wherein the data lines belonging to a same group are provided with a same touch driving signal in the touch mode, wherein a controller provides the digital pixel data to an input terminal of the latch in the display mode and provides the digital cluster data to the input terminal of the latch in the touch mode.

11. The touch display module of claim 10, wherein each of the driving channels further comprises a unity-gain buffer, an input terminal of the unity-gain buffer being coupled to the output terminal of the first multiplexer, and an output terminal of the unity-gain buffer being coupled to one of the data lines of the touch display panel.

12. The touch display module of claim 10, wherein the touch panel signals comprises a sine signal or a cosine signal.

13. The touch display module of claim 10, wherein each of the driving channels further comprises a buffer, an input terminal of the buffer being coupled to the output terminal of the first multiplexer, and an output terminal of the buffer being coupled to one of the data lines of the touch display panel.

14. The touch display module of claim 13, wherein the touch panel signals comprises a digital signal, and the buffer receives the digital signal through the first multiplexer and converts the digital signal into the touch driving signal in the touch mode.

15. The touch display module of claim 10, wherein the voltage generation circuit is a gamma voltage generation circuit.

16. The touch display module of claim 10, wherein the voltage generation circuit comprises:
a gamma voltage generation circuit having a plurality of output terminals coupled one by one to the conductive lines of the reference voltage bus, wherein the gamma voltage generation circuit provides the gamma voltages through the reference voltage bus to the input terminals of the first multiplexers in the display mode, and the gamma voltage generation circuit is disabled in the touch mode; and
a touch panel signal generation circuit having a plurality of output terminals coupled one by one to the conductive lines of the reference voltage bus, wherein the touch panel signal generation circuit provides the touch panel signals through the reference voltage bus to the input terminals of the first multiplexers in the touch mode, and the touch panel signal generation circuit is disabled in the display mode.

17. The touch display module of claim 16, wherein the touch panel signal generation circuit comprises:
a touch panel signal generator generating the touch panel signals; and
a plurality of second multiplexers, a plurality of input terminals of any one of the second multiplexers being coupled to the touch panel signal generator for receiving the touch panel signals, and an output terminal of any one of the second multiplexers being coupled to one of the conductive lines of the reference voltage bus.

* * * * *